United States Patent
Jiang et al.

(10) Patent No.: US 8,019,584 B2
(45) Date of Patent: Sep. 13, 2011

(54) METHOD AND SYSTEM FOR MODELING LIKELY INVARIANTS IN DISTRIBUTED SYSTEMS

(75) Inventors: Guofei Jiang, Princeton, NJ (US);
Haifeng Chen, Piscataway, NJ (US);
Kenji Yoshihira, Cranford, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1101 days.

(21) Appl. No.: 11/685,805

(22) Filed: Mar. 14, 2007

(65) Prior Publication Data
US 2008/0027688 A1    Jan. 31, 2008

Related U.S. Application Data

(60) Provisional application No. 60/820,831, filed on Jul. 31, 2006.

(51) Int. Cl.
*G06F 17/50* (2006.01)
*G06F 7/60* (2006.01)
*G06F 11/00* (2006.01)

(52) U.S. Cl. ............... 703/13; 703/1; 703/2; 714/51
(58) Field of Classification Search ............... 703/1, 13, 703/2; 714/51; 704/51
See application file for complete search history.

(56) References Cited

U.S. PATENT DOCUMENTS

| 5,819,093 | A | 10/1998 | Davidson et al. |
| 6,042,614 | A | 3/2000 | Davidson et al. |
| 7,092,941 | B1 * | 8/2006 | Campos ............... 1/1 |
| 7,185,319 | B2 | 2/2007 | Kaier et al. |
| 7,363,281 | B2 * | 4/2008 | Jin et al. ............... 706/13 |
| 7,590,513 | B2 * | 9/2009 | Jiang et al. ............. 703/2 |
| 2007/0028220 | A1 * | 2/2007 | Miller et al. ........... 717/124 |
| 2009/0292954 | A1 * | 11/2009 | Jiang et al. ............ 714/47 |

OTHER PUBLICATIONS

"Partitioning-based clustering for Web document categorization" Daniel Boley, et al. Decision Support Systems, 1999.*
"Robust Process Detection Using Nonparametric Weak Models" Jiang, Guofei. International Journal of Intelligent Control and Systems. Mar. 2005.*
"Failure Detection and Localization in Component Based Systems by Online Tracking" Chen, et al. KDD'05, Aug. 21-24, 2005.*
Jiang, Guofei et al., "Discovering Likely Invariants in Distributed Transaction Systems for Automatic System Management", Cluster Computing 9(4), pp. 385-399, 2006.
Jiang, Guofei et al., "Modeling and Tracking of Transaction Flow Dynamics for Fault Detection in Complex Systems", IEEE Trans. Dependable Sec. Comput., 3(4), pp. 312-326, 2006.

* cited by examiner

*Primary Examiner* — Paul Rodriguez
*Assistant Examiner* — Nithya Janakiraman
(74) *Attorney, Agent, or Firm* — Joseph Kolodka

(57) ABSTRACT

Disclosed is a method and system for modeling invariant relationships between flow intensity measurements in a distributed system. In the method, a measurement is randomly selected from a plurality of flow intensity measurements. The method searched for relationships between the randomly selected measurement and each remaining one of the plurality of flow intensity measurements, and each of the flow intensity measurements having a relationship with the randomly selected measurement is grouped into a cluster with the randomly selected measurement. The method than determines relationships between all of the flow intensity measurements in the cluster. This method is repeated with the remaining flow intensity measurements until all of the flow intensity measurements are grouped into a cluster.

3 Claims, 11 Drawing Sheets

Input: $I_i(t)$, $1 \leq i \leq n$
Output: $M_k$ and $p_k(\theta)$ for each time window $k$ 302　Part I: Invariant Search
　　at time $t = l$ (i.e., $k = 1$),
　　　for each $I_i$ and $I_j$, $1 \leq i, j \leq n$, $i \neq j$
　　　　learn a model $\theta_{ij}$ using Equation (7);
　　　　compute $F_1(\theta_{ij})$ with Equation (8);
　　　　if $F_1(\theta_{ij}) > \widetilde{F}$, then
　　　　　set $M_1 = M_1 \cup \{\theta_{ij}\}$ and $p_1(\theta_{ij}) = 1$.

304　Part II: Invariant Validation
　　for each time $t = k \cdot l$, $k > 1$,
　　　for each $\theta_{ij} \in M_k$,
　　　　compute the $F_k(\theta_{ij})$ with Equation (8) using
　　　　　$I_i(t)$ and $I_j(t)$, $(k-1) \cdot l + 1 \leq t \leq k \cdot l$;
　　　　update $p_k(\theta_{ij})$ with Equation (10);
　　　　if $p_k(\theta_{ij}) \leq P$ and $k \geq K$,
　　　　　then remove $\theta_{ij}$ from the $M_k$.
　　output $M_k$ and $p_k(\theta)$.
　　$k = k + 1$.

FIG. 3

Input: $I_i(t)$, $1 \leq i \leq n$
Output: $M_1$ and $p_1(\theta)$ at time $t = l$ (i.e., $k = 1$), set $C_1 = C$, $M_1 = \phi$ and $s = 1$.
do
652 ⟶ randomly select one measurement $I_i$ from $C_s$;
    set $W_s = \{I_i\}$;
654 $\Big\{$ for each $I_j \in C_s$, $j \neq i$
    learn a model $\theta_{ij}$ using Equation (7);
656 $\Bigg\{$ compute $F_1(\theta_{ij})$ with Equation (8);
    if $F_1(\theta_{ij}) > \widetilde{F}$, then
      set $M_1 = M_1 \cup \{\theta_{ij}\}$, $p_1(\theta_{ij}) = 1$, $W_s = W_s \cup \{I_j\}$.

658 $\Bigg\{$ for each $I_u, I_v \in W_s - \{I_i\}$, $u \neq v$
    learn a model $\theta_{uv}$ using Equation (7);
    compute $F_1(\theta_{uv})$ with Equation (8);
    if $F_1(\theta_{uv}) > \widetilde{F}$, then
      set $M_1 = M_1 \cup \{\theta_{uv}\}$, $p_1(\theta_{uv}) = 1$.

$C_{s+1} = C_s - W_s$.
    $s = s + 1$.
while $C_s$ is not empty.
return $M_1$ and $p_1(\theta)$.

FIG. 6B

Input: $I_i(t)$, $1 \leq i \leq n$
Output: $M_1$ and $p_1(\theta)$ at time $t = 1$ (*i.e.*, $k = 1$), set $C_1 = C$, $M_1 = \phi$ and $s = 1$.
do
   randomly select one measurement $I_i$ from $C_s$;
   set $W_s = \{I_i\}$;
   for each $I_j \in C_s$, $j \neq i$
     learn a model $\theta_{ij}$ using Equation (7);
     compute $F_1(\theta_{ij})$ with Equation (8);
     if $F_1(\theta_{ij}) > \widetilde{F}$, then
       set $M_1 = M_1 \cup \{\theta_{ij}\}$, $p_1(\theta_{ij}) = 1$, $W_s = W_s \cup \{I_j\}$.

for each $I_u, I_v \in W_s - \{I_i\}$, $u \neq v$
     <u>derive a model $\theta_{uv}$ using $\theta_{ui}$, $\theta_{iv}$,</u>
     <u>and Equations (21)-(24);</u>
     compute $F_1(\theta_{uv})$ with Equation (8);
     if $F_1(\theta_{uv}) > \widetilde{F}$, then
       set $M_1 = M_1 \cup \{\theta_{uv}\}$, $p_1(\theta_{uv}) = 1$.

$C_{s+1} = C_s - W_s$.
   $s = s + 1$.
while $C_s$ is not empty.
return $M_1$ and $p_1(\theta)$.

METHOD AND SYSTEM FOR MODELING LIKELY INVARIANTS IN DISTRIBUTED SYSTEMS

This application claims the benefit of U.S. Provisional Application No. 60/820,831 filed Jul. 31, 2006, the disclosure of which is herein incorporated by reference.

BACKGROUND OF THE INVENTION

The invention relates generally to the field of fault detection and localization in complex systems. More specifically, embodiments of the invention relate to methods and systems for automatically modeling transaction flow dynamics in distributed transaction systems for fault detection and localization.

Today, numerous Internet services such as Amazon, eBay and Google, etc. are changing traditional business models. With the abundance of Internet services, there are unprecedented needs to ensure their operational availability and reliability. Minutes of service downtime can lead to severe revenue loss and user dissatisfaction.

An information system for an Internet service is typically large, dynamic, and distributed and can comprise thousands of individual hardware and software components. A single failure in one component, whether hardware or software related, can cause an entire system to be unavailable. Studies have shown that the time taken to detect, localize, and isolate faults accounts for a large portion of the time to recover from a failure.

Transaction systems with user requests, such as Internet services and others, receive large numbers of transaction requests from users everyday. These requests flow through sets of components according to specific application software logic. With such a large volume of user visits, it is unrealistic to monitor and analyze each individual user request.

Data from software log files, system audit events, network traffic statistics, etc., can be collected from system components and used for fault analysis. Since operational systems are dynamic, this data is reflective of the status of their internal states, including faults. However, given the distributed nature of information systems, evidence of fault occurrence is often scattered among the monitored data.

Advanced monitoring and management tools for system administrators to interpret monitoring data are available. IBM Tivoli, HP OpenView, and EMC InCharge suite are some of the products in the growing market of system management software. Most current tools support some form of data pre-processing and enable users to view the data with visualization functions. These tools are useful for a system administrator since it is impracticable to manually scan a large amount of monitoring data. However, these tools employ simple rule-based correlation with little embedded intelligence for reasoning.

Rule-based tools generate alerts based on violations of predetermined threshold values. Rule-based systems are therefore stateless and do not manage dynamic data analysis well. The lack of intelligence results from the difficulty in characterizing the dynamic behavior of complex systems. Characterization across complex systems is inherently system-dependent in that it is difficult to generalize across systems with different architectures and functionality.

Detection and diagnosis of faults in complex information systems is a formidable task. Current approaches for fault diagnosis use event correlation which collects and correlates events to locate faults based on known dependencies between faults and symptoms. Due to the diversity of runtime environments, many faults experienced in an interconnected system are not very well understood. As a result, it is difficult to obtain precise fault-symptom dependencies.

One attempt at understanding relationships between system faults and symptoms was performed by the Berkeley/Stanford Recovery-Oriented Computing (ROC) group. JBoss middleware was modified to monitor traces in J2EE (Java2 Enterprise Edition) platforms. JBoss is an open source J2EE based application server implemented in pure Java. J2EE is a programming platform for developing and running distributed multi-tier architecture applications, based largely on modular components running on an application server. Two methods were developed to collect traces for fault detection and diagnosis. However, with the huge volume of user visits, monitoring, collecting and analyzing the trace of every user request was problematic. Most methods of collecting user request traces results in a large monitoring overhead.

It is a major challenge for system administrators to detect and isolate faults effectively in large and complex systems. The challenge is how to correlate the collected data effectively across a distributed system for observation, fault detection and identification. It is therefore desirable to develop a method and system that considers the mass characteristics of user requests in complex systems and has self-cognition capability to aid in fault analysis.

BRIEF SUMMARY OF THE INVENTION

The present invention provides a method and system capable of automatically modeling transaction flow dynamics in distributed systems. The present invention models relationships between flow intensity measurements in distributed systems. Flow intensity is defined herein as the intensity with which internal monitoring data of a distributed system reacts to the volume of user requests. The present invention models relationships between flow intensities at various points in a distributed system in order to extract invariant relationships which do not change in response to external changes.

According to embodiments of the present invention, one measurement is randomly selected from a plurality of flow intensity measurements. The relationships between that measurement and each remaining one of the plurality of flow intensity measurements are searched, and each of the flow intensity measurements having a relationship with the randomly selected measurement is grouped into a cluster with the randomly selected measurement. Relationships are then determined between all of the flow intensity measurements in the cluster. These steps are repeated with the remaining flow intensity measurements until all of the flow intensity measurements are grouped into a cluster.

In one embodiment of the present invention, the relationships between all of the flow intensity measurements grouped into a cluster are determined by modeling the relationships based on the flow intensity measurements. For example, an AutoRegressive model with eXogenous inputs (ARX) can be used to model these relationships. In another embodiment of the present invention, the relationships between all of the flow intensity measurements grouped into a cluster are mathematically derived from the relationship between the selected measurement and each of the flow intensity measurements in the cluster.

These and other advantages of the invention will be apparent to those of ordinary skill in the art by reference to the following detailed description and the accompanying drawings.

BRIEF DESCRIPTION OF THE DRAWINGS

FIG. 3 illustrates pseudo-code for a FullMesh method of extracting invariant relationships between flow intensity measurements;

FIG. 6B illustrates pseudo code of the method shown in FIG. 6A;

FIG. 8B is pseudo code of the method shown in FIG. 8A;

DETAILED DESCRIPTION

Embodiments of the present invention are directed to modeling invariant relationships among flow intensity measurements calculated based on monitoring data collected at various points in a distributed system. It should be noted that the invention is not limited to any particular software language described or implied in the figures. One of skill in the art will understand that a variety of alternative software languages may be used for implementation of the invention. It should also be understood that some components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Figure 1:
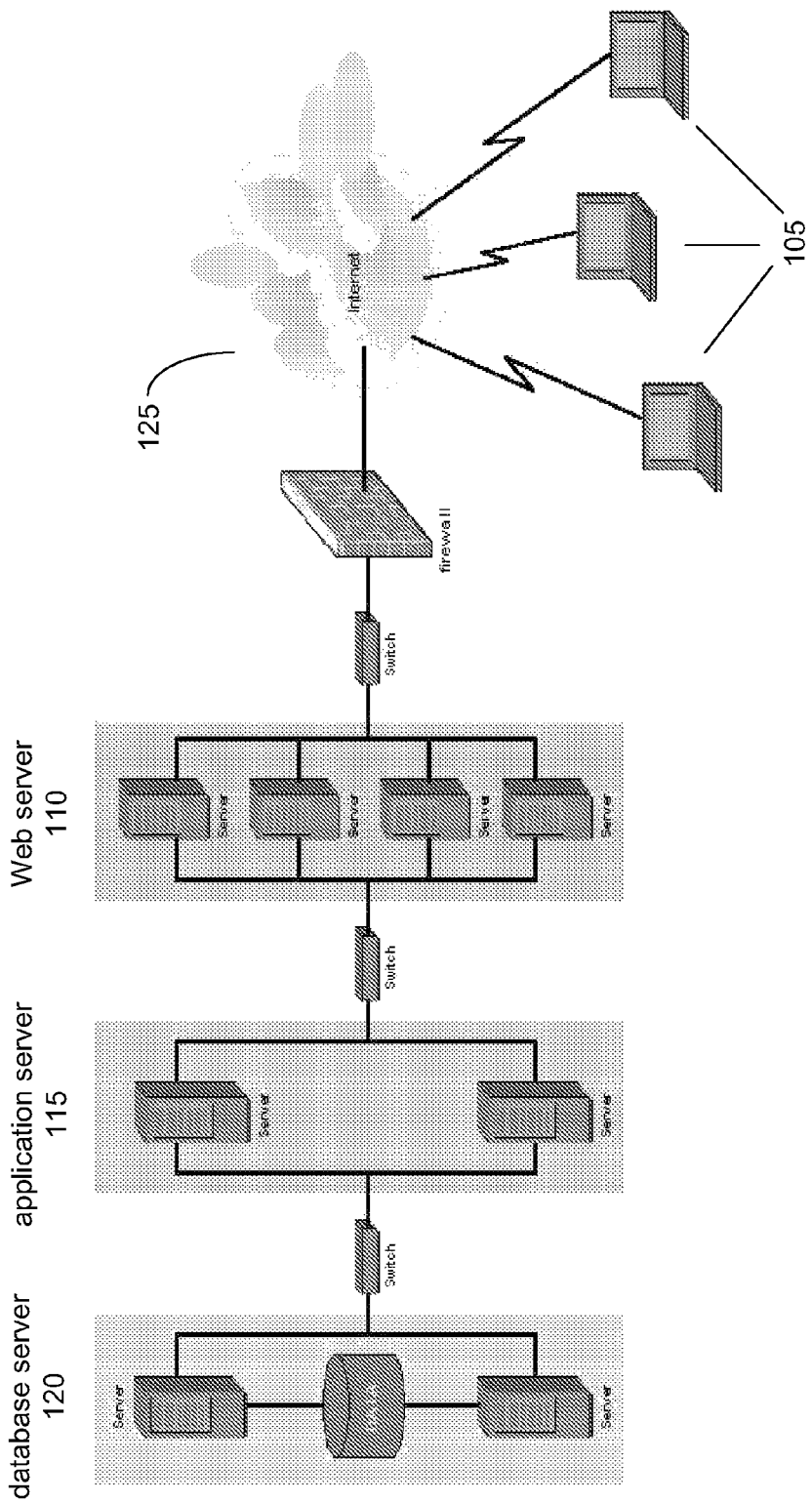
FIG. 1 illustrates an exemplary distributed transaction system.

A distributed transaction system is a structure in which network resources, such as switching equipment and processors are distributed throughout a geographical area being served and where processing is shared by many different parts of the network. FIG. 1 illustrates an exemplary distributed transaction system 100. Processing may be shared by client (local) computers 105, file servers, Web servers, application servers and database servers. Switching may be performed by electronic, optical, or electromechanical devices. The capability of individual computers being linked together as a network is familiar to one skilled in the art.

Most distributed transaction systems, such as Internet services, employ multi-tier architectures to integrate their components. Referring to FIG. 1, a typical three-tier architecture is shown which includes Web servers (Web tier) 110, application servers (middleware) 115, and database servers (database tier) 120. Individual computers 105 at a plurality of locations can communicate with a plurality of Web servers 110 via a communication network 125, such as the Internet. The Web servers 110 communicate with other servers, such as application servers 115 and database servers 120.

The Web server 110 acts as an interface, or gateway, to present data to a client's browser. The application server 115 supports specific business, or application logic for various applications which generally includes the bulk of an application. The back-end database server 120 is used for data storage.

Each tier can be built from a number of software packages running on servers (computers) which provide similar functionality. For example, such software packets may include Apache and IIS for the Web server, WebLogic and WebSphere for the application server, Oracle and DB2 for the database server, and others.

Distributed transaction systems can receive millions of user requests per day. User requests traverse a set of components and software paths according to application logic. During system operation, various system components produce large amounts of monitoring data, such as log files, to track their operational status. Much of the internal monitoring data of a system reacts to the volume of user requests. Thus, values of the monitoring data increase or decrease in accordance with the volume of user requests. Flow intensity is the intensity with which internal monitoring data of a system reacts to the volume of user requests. For example, the number of HTTP (Hypertext Transfer Protocol) request strings and SQL (Structured Query Language) queries measured over discrete sampling time periods can be used as flow intensity measurements. Measurements other than HTTP requests and SQL queries can also be used as well. Multiple flow intensity measurements can be acquired from one single monitoring point in the system. For example, a Web server access log can be used to derive the flow intensity measurements of all HTTP requests made through that server as well as one specific HTTP request.

Since flow intensity measurements at different points in a system respond similarly to the volume of user requests, there may exist a strong correlation or cointegration between many flow intensity measurements in a system. The correlation between flow intensities measured at the input and output of a component in a system could reflect constraints that the component should bear. As an engineered system, a distributed system imposes many constraints on the relationships between flow intensity measurements. Such constraints could result from a variety of factors such as hardware capacity, application software logic, system architecture and functionality. Because of such constraints, many relationships between flow intensity measurements are always constant, regardless of changes in flow intensities in response to varying user loads. Thus, if a relationship between flow intensities holds over time, the relationship can be considered an invariant relationship or an invariant of the underlying system. Invariant relationships widely exist in distributed systems, and are governed by the physical properties or logical constraints of system components.

According to embodiments of the present invention, it is possible to model flow intensity measurements in a distributed system and relationships between flow intensity measurements. For convenience, variables such as x and y are used herein to represent flow intensity measurements and equations such as $y=f(x)$ are used to represent invariants. As described above, many flow intensity measurements change in response to changes in the volume of user requests in the system. As a time series, flow intensity measurements that correlate to each other should have similar evolving curves with the workload along time t. Therefore, many flow intensities should have linear relationships with each other. Accordingly, embodiments of the present invention use AutoRegressive models with eXogenous inputs (ARX) to learn linear relationships between flow intensity measurements.

At time t, the flow intensity measurements measured at the input and output of a component (or segment) of a distributed system can be denoted as x(t) and y(t), respectively. A segment of a distributed system is a path in a distributed system between two flow intensity measurements, and can include multiple components. The ARX model describes the following relationship between two flow intensities x(t) and y(t):

$$y(t)+a_1y(t-1)+\ldots+a_ny(t-n)=b_0x(t-k)+\ldots+b_mx(t-k-m), \quad (1)$$

where [n,m,k] is the order of the model, which determines how many previous steps are affecting the current output, and $a_i$ and $b_j$ are coefficient parameters that reflect how strongly a previous step is affecting the current output. If we denote:

$$\theta=[a_1,\ldots,a_n,b_0,\ldots,b_m]^T \quad (2)$$

$$\alpha(t)=[-y(t-1),\ldots,-y(t-n),x(t-k),\ldots,x(t-k-m)], \quad (3)$$

then Equation (1) can be rewritten as:

$$y(t)=\alpha(t)^T\theta. \quad (4)$$

Assuming that the two flow intensity measurements x(t) and y(t) are observed over a time interval $1\leq t\leq N$, this observation can be denoted as:

$$O_N=\{x(1),y(1),\ldots,x(N),y(N)\}. \quad (5)$$

For a given θ, the observed inputs x(t), can be used to calculate simulated outputs ŷ(t|θ) according Equation (1). Thus, an estimation error can be calculated by comparing the simulated outputs with real observed outputs. The estimation error can be defined as:

$$E_N(\theta, O_N) = \frac{1}{N}\sum_{t=1}^{N}(y(t)-\hat{y}(t|\theta))^2 \quad (6)$$

$$= \frac{1}{N}\sum_{t=1}^{N}(y(t)-\alpha(t)^T\theta)^2.$$

Using the Least Squares Method (LSM), it is possible to find θ that minimizes the estimation error $E_N(\theta,O_N)$ as follows:

$$\hat{\theta}_N = \left[\sum_{t=1}^{N}\alpha(t)\alpha(t)^T\right]^{-1}\sum_{t=1}^{N}\alpha(t)y(t). \quad (7)$$

Note that the ARX model can also be used to model the relationship between multiple inputs and multiple outputs. Accordingly, it is possible to have multiple flow intensities as the inputs and/or outputs in Equation (1). For simplicity, the correlation between two flow intensities is modeled and analyzed herein, however, the same methods can be applied with multiple flow intensities as inputs and or outputs.

There are several possible criteria that can be used to evaluate how the learned model fits the real observation. According to an embodiment of the present invention, a normalized fitness score can be calculated for model validation using the following equation:

$$F(\theta) = \left[1 - \sqrt{\frac{\sum_{t=1}^{N}|y(t)-\hat{y}(t|\theta)|^2}{\sum_{t=1}^{N}|y(t)-\bar{y}|^2}}\right] \cdot 100, \quad (8)$$

where ȳ is the mean of the real output y(t). Equation (8) introduces a metric to evaluate how well the learned model approximates the real data. A higher fitness score indicates that the model fits the observed data better, and the upper bound for the fitness score is 100. Given the observation of two flow intensities, Equation (7) can always be used learn a model even if this model does not reflect a meaningful relationship between the flow intensities. Therefore, only a model with a high fitness score is meaningful in characterizing relationships between flow intensity measurements. A range can be set for the order [n,m,k] rather than a fixed number, in order to learn a list of model candidates. The model with the highest fitness score of the list of model candidates can be chosen from the list of model candidates to characterize the flow intensity relationship. As described herein, the ARX model is used to learn the long-run relationship between two flow intensity measurements, i.e., a model y=f(x) only captures the main characteristics of the relationship. The precise relationship between two flow intensity measurements can be represented as y=f(x)+ϵ where ϵ is a modeling error. Note that ϵ is very small for a model with a high fitness score. Accordingly, such models with high fitness scores can be considered likely invariants.

Figure 2:
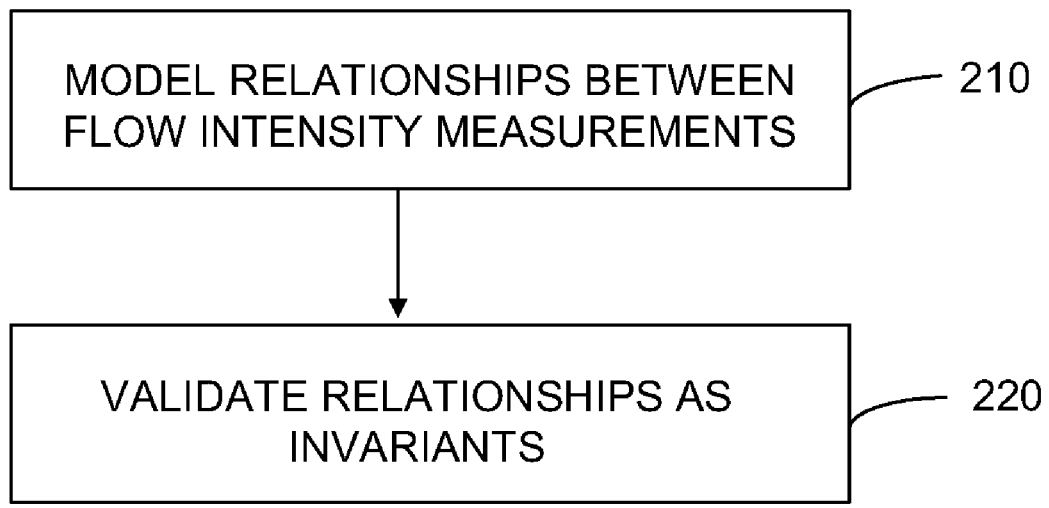
FIG. 2 illustrates a method for extracting invariant relationships between flow intensity measurements in a distributed system.

Given the model template shown in Equation (1), it is possible to learn a model instance between two flow intensity measurements. It is possible to collect many flow intensity measurements in a complex distribute system, but not all pairs of the flow intensity measurements have such linear relationships. In addition, due to system dynamics and uncertainties, some learned models may not be robust over a period of time. Embodiments of the present invention are directed to extracted invariant relationships between flow intensity measurements in a distributed system. FIG. 2 illustrates a method for extracting invariant relationships between flow intensity measurements in a distributed system. At step 210 relationships between flow intensity measurements are modeled, and at step 220 the relationships between the flow intensity measurements are validated to determine which of the modeled relationships are invariants.

The present inventors introduced a method for modeling and validating relationships between flow intensity measurements in U.S. patent application Ser. No. 11/275,796, which is incorporated herein by reference. This method will be referred to herein as the "FullMesh" method. FIG. 3 illustrates pseudo-code for the FullMesh method. Assume that there are n flow intensity measurements denoted by $I_i$, $1\leq i\leq n$. Since there many be little or no knowledge about the relationships of the flow intensity measurements in a specific system, the FullMesh method attempts to model a relationship between each of the flow intensity measurements (step 210 of FIG. 2), and then validate whether the models fit new monitoring data (step 220 of FIG. 2). Accordingly, as illustrated in FIG. 3, the FullMesh method comprises two parts: invariant search 302 and invariant validation 304. Part I 302 of the FullMesh method searches for a model for any two flow intensity measurements and then Part II 304 sequentially validates these models with new monitoring data. As illustrated in FIG. 3, Part I 302 of the FullMesh method searches for a relationship between every combination of intensity measurements $I_i$ and $I_j$ in the set of flow intensity measurements using Equation (7). The fitness score $F_i(\theta)$ given by Equation (8) is used to evaluate how well a learned model matches the data observed during the $i^{th}$ time window. The length of this time window is denoted as L, i.e., the window includes L sampling points. A threshold $\tilde{F}$ is selected to determine whether the fitness score $F_i(\theta)$ is high enough for the model to fit the data. The following piecewise function can be used to determine whether a model fits the data:

$$f(F_i(\theta)) = \begin{cases} 1 & \text{if } F_i(\theta) > \tilde{F} \\ 0 & \text{if } F_i(\theta) \leq \tilde{F} \end{cases} \quad (9)$$

After receiving monitoring data for k windows, i.e., total of k·L sampling points, a confidence score $p_k$ can be calculated for a model $\theta$ using the following equation:

$$p_k(\theta) = \quad (10)$$

$$prob(F_t(\theta) > \tilde{F}) = \frac{\sum_{i=1}^{k} f(F_i(\theta))}{k} = \frac{p_{k-1}(\theta) \cdot (k-1) + f(F_k(\theta))}{k}.$$

Figure 4:
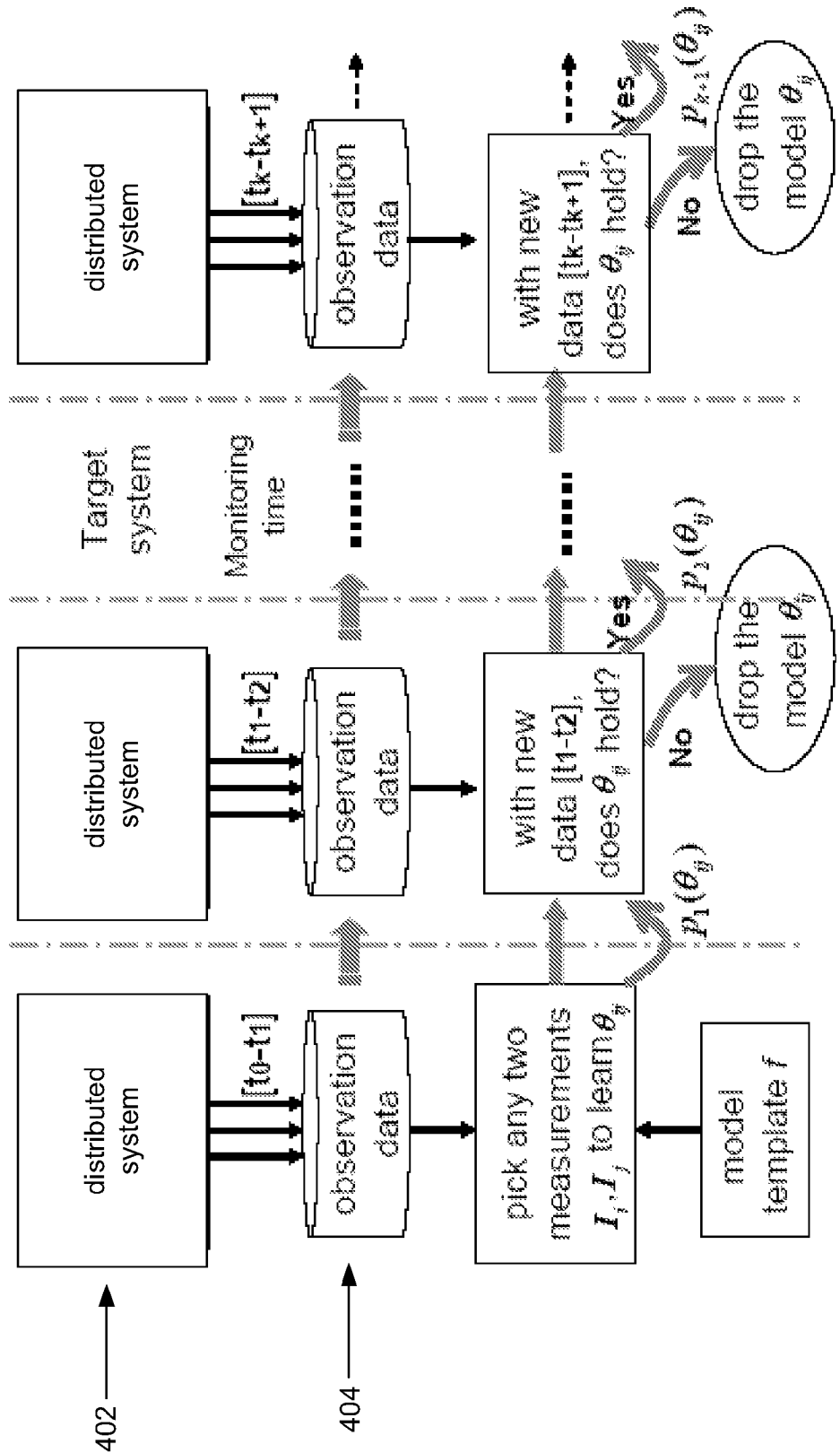
FIG. 4 illustrates sequential validation of modeled relationships.

The set of valid models at time t=k·L can be denoted as $M_k$, such that $M_k=\{\theta | p_k(\theta)>P\}$. P is the confidence threshold selected to determine whether a model is an invariant. Thus, in Part II 304 of the FullMesh method, after a time period K, if the confidence score of a model is less than the selected confidence threshold P, the model is considered invalid, and no longer has to be validated. FIG. 4 illustrates sequential validation of modeled relationships. As illustrated in FIG. 4, observation data 404 including flow intensity measurements is collected at various points in a distributed system 402. At the time $t_0$, a model is learned between two flow intensity measurements based on the observation data at $t_0$. At each time window thereafter, the learned model is tested based on the new observation data 404 collected from the distributed system 402, and if the model does not hold, it is dropped and not considered an invariant. If the model holds for k time windows, the model is considered an invariant.

The FullMesh method performs step 210 of FIG. 2 in Part I 302, and performs step 220 of FIG. 2 in Part II 304. The computational complexity of the FullMesh method is greater in Part I than in Part II. Given n flow intensity measurements, Part I needs to construct n(n−1)/2 models as the candidates of invariants. Note that given two flow intensity measurements, logically we do not know which one should be chosen as the input or the output in complex systems. Therefore, the FullMesh method, as well as the embodiments of the present invention described below, construct two models (with reverse input and output) for each pair of flow intensity measurements, and select the model with the highest fitness score as the invariant candidate. If the two learned models have very different fitness scores, an AutoRegressive (AR) model must have been constructed instead of an ARX model. Since we are only interested in strong correlation between two measurements, it is possible to filter out those AR models by requesting high fitness scores in both models.

The computational complexity of Part I of the FullMesh method is also higher than Part II because Part I requires the matrix inverse operation in Equation (7). Though Part I of the FullMesh method can run offline to search invariants, it still may not scale well in large distributed systems. Thus, embodiments of the present invention described below are directed to methods of modeling relationships between flow intensity measurements while reducing computational complexity. The methods described in these embodiments approximate Part I of the FullMesh method and can be used to perform step 210 of FIG. 2. Part II of the FullMesh method can be used with each the embodiments of the present invention to validate (step 220 of FIG. 2) the models constructed by the embodiments of the present invention.

Figure 5:
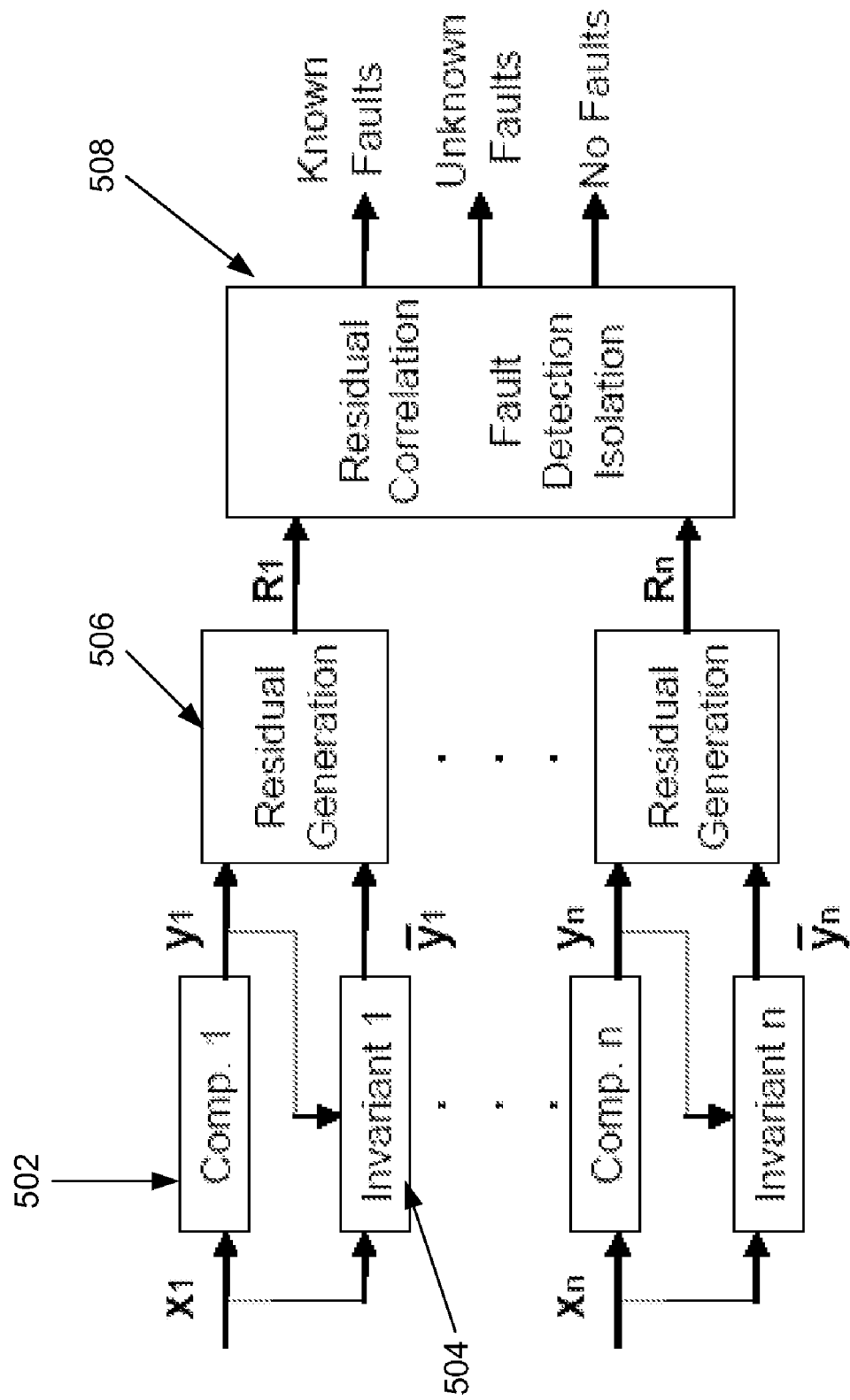
FIG. 5 illustrates an exemplary invariant based fault detection and isolation method.

According to an embodiment of the present invention, it is possible to track any changes to the invariants extracted using the method of FIG. 2 for fault detection in complex distributed systems. FIG. 5 illustrates an exemplary invariant based fault detection and isolation (FDI) method. As illustrated in FIG. 5, flow intensities x and y are measured at the input and output of a system component 502, respectively, and an invariant relationship 504 of y=f(x) is derived between the flow intensity measurements x and y. At time t, $y_t$ represents the actual observed output of the component 502 at time t, and $\bar{y}_t$ is the simulated output from the invariant 504, i.e., $\bar{y}_t=f(x_t)$, where $x_t$ is the observed input at time t. A residual is calculated (506) as $R_t=|y_t-\bar{y}_t|$. When no fault occurs, it should be the case that the residual $R_t \leq \epsilon_M$, where $\epsilon_M$ is the threshold of modeling error. If a fault occurs within this component 502 at time t, it may affect this relationship and the invariant is likely to be violated. Therefore, at each time t, it is checked whether $R_t \leq \epsilon_M$. If $R_t$ is greater than $\epsilon_M$, then a fault has occurred in component 502 at time t. As illustrated in FIG. 5, this fault detection can be performed simultaneously at each time t for n components and invariants. In FIG. 5, a "component" 502 represents a segment of the monitored system which has input x and output y. The residuals generated from of each of the n invariants can be correlated (508) in order to isolate faults in the components.

Based on various physical meanings of flow intensity measurements, invariants could characterize target systems from many different perspectives. With various combinations of many invariants extracted from distributed systems, it is possible to detect a wide class of faults in complex systems, including operator faults, software faults, hardware faults, and networking faults. Based on the dependency relationships between invariants and their monitoring components, it is also possible to isolate faults by correlating broken invariants. In addition, the combination of invariants can also be used to capture, index, and retrieve system history. For example, a binary vector can be used to represent the status of all invariants (broken or not), in order to build profiles or signatures for various faults. Thus, when a fault is identified and isolated (508 of FIG. 5), the fault can be characterized into a known or unknown fault.

Although fault detection and isolation is described herein as a possible use of invariants in distributed systems, the present invention is not limited to fault detection and isolation. For example, the inventive technique can be used in a wide range of measurement technologies to determine when measured results diverge from optimal results. In addition, invariants can also be used to support other system management tasks, such as service profiling, performance debugging, capacity planning, resource optimization, situation awareness, etc.

Figure 6A:
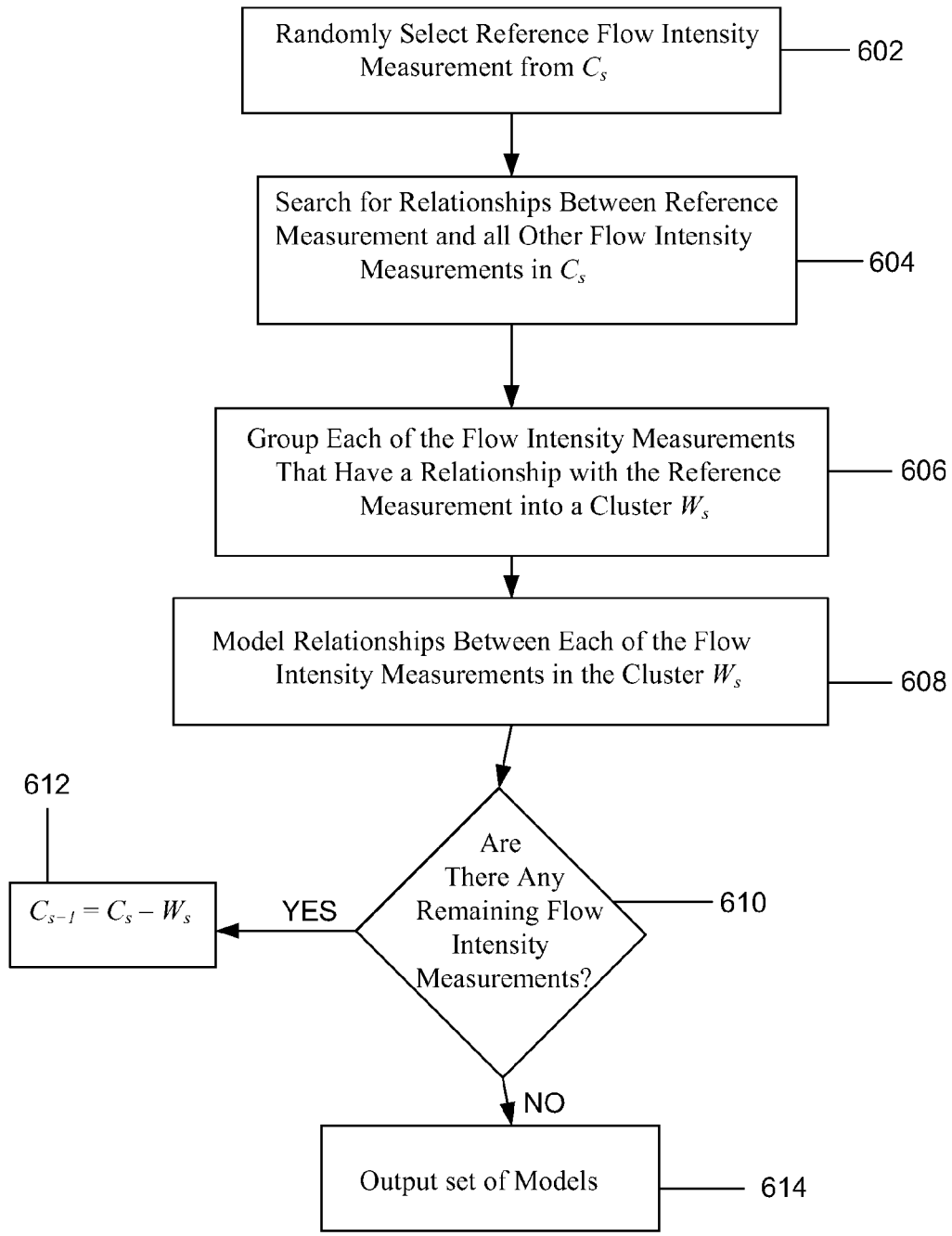
FIG. 6A illustrates a method of modeling relationships between flow intensity measurements in a distributed system according to an embodiment of the present invention.

FIG. 6A illustrates a method of modeling relationships between flow intensity measurements in a distributed system according to an embodiment of the present invention. FIG. 6B is pseudo code of the method of FIG. 6A. One skilled in the art will readily be able to associate portions of the pseudo code of FIG. 6B with the steps of FIG. 6A. For convenience, the method of FIGS. 6A and 6B is referred to herein as the "SmartMesh" method. Rather than searching all possible n(n−1)/2 relationships, as in the FullMesh method, the SmartMesh method sequentially extracts invariants from clusters that are determined by search results from previous steps of the method. As described above, the SmartMesh method can be used to perform step 210 of the method of FIG. 2.

The set of all measurements can be denoted as $C=\{I_i\}$, $1 \leq i \leq n$, and an empty set denoted as $\phi$. At step 602, one flow intensity measurement $I_i$ is randomly selected from the set C of flow intensity measurements as a reference measurement. This step is shown at 652 in the pseudo code of FIG. 6B.

At step 604, the SmartMesh method searches for relationships between the reference measurement $I_i$ and all of the other flow intensity measurements in the set C. This step is shown at 654 of the pseudo code of FIG. 6B. As illustrated at 654 of the pseudo code of FIG. 6B, a model θ is learned using Equation (7) for the relationship between the reference measurement $I_i$ and each of the other flow intensity measurements.

At step 606, each of the flow intensity measurements that have a relationship with the reference measurement $I_i$ is grouped with the reference measurement $I_i$ into a cluster $W_s$ associated with the reference measurement $I_i$. This step is shown at 656 of the pseudo code of FIG. 6B. As illustrated at 656 of the pseudo code of FIG. 6B, the fitness score $F_1(\theta)$ is calculated for each model θ learned. The fitness score $F_1(\theta)$ is compared to the fitness threshold $\tilde{F}$ for each model, to determine whether the reference measurement $I_i$ has a relationship which each of the other flow intensity measurements in C. If a flow intensity measurement is determined to have a relationship with the reference measurement $I_i$, the flow intensity measurement is included with the reference measurement $I_i$ in the cluster $W_s$, and the model θ of the relationship between the flow intensity measurement and the reference measurement $I_i$ is included in a set of invariant candidates $M_1$.

At step 608, relationships between each of the flow intensity measurements in the cluster $W_s$ are modeled. Since all flow intensity measurements in the cluster $W_s$ have linear relationships with the reference measurement $I_i$, they are likely to have linear relationships between each other. Conversely, since the remaining flow intensity measurements $C-W_s$ do not have linear relationships with reference measurement $I_i$, they are unlikely to have linear relationships with other measurements in the cluster $W_s$ of the reference measurement $I_i$. Thus, the SmartMesh method does not search any relationships between flow intensity measurements that belong to different clusters. This step is shown at 658 of the pseudo code of FIG. 6B. As illustrated at 658 of the pseudo code of FIG. 6B, the models of the relationships between each of the flow intensity measurements included in the cluster $W_s$ are learned using Equation (7). Thus, these models are calculated directly based on monitoring data. The fitness score of each model is calculated using Equation (8), and compared to the fitness threshold $\tilde{F}$. Each model for which the fitness score is greater than the fitness threshold $\tilde{F}$, is included in the set of invariant candidates $M_1$.

At step 610, it is determined whether there are any remaining flow intensity measurements that have not been grouped into a cluster. If any flow intensity measurements remain that have not been grouped into a cluster, the SmartMesh method proceeds to step 612. If there are no remaining flow intensity measurements, the SmartMesh algorithm proceeds to step 614. At step 612, the set $C_{s+1}$ for a next iteration is defined as the remaining flow intensity measurements $C_s - W_s$, and steps 602-610 are repeated for the remaining flow intensity measurements $C_{s+1}$. Thus, the method is repeated until all of the flow intensity measurements are grouped into clusters of related measurements. Note that $\Sigma_s |W_s| = |C| = n$, where $|\cdot|$ represents the size of a set. If one flow intensity measurement does not have any relationships (with a high enough fitness score) with any other measurements in C, this single flow intensity measurement is considered to be a cluster with size equal to one.

At step 614, when there are no remaining flow intensity measurements to be grouped into clusters, the set of models $M_1$ is output. This set represents a set of invariant candidates which can be validated using Part II of the FullMesh method described above.

Figure 7:
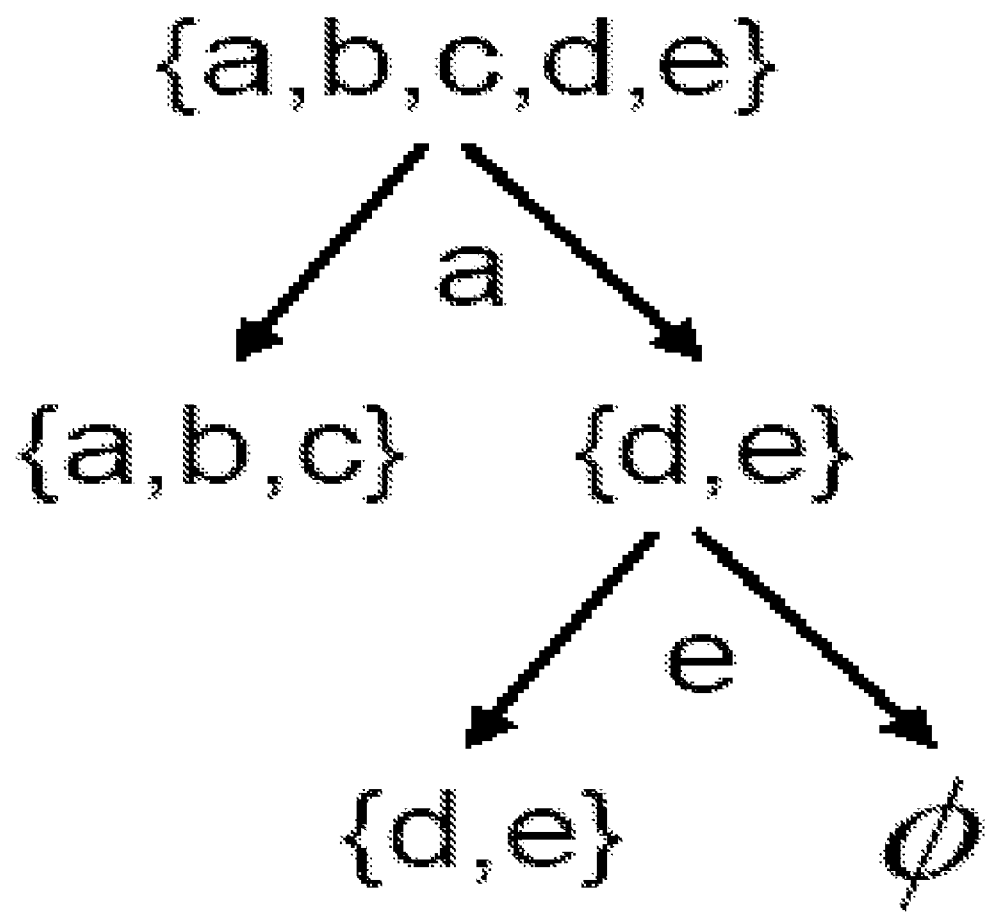
FIG. 7 illustrates an example of the method shown in FIG. 6A.

FIG. 7 illustrates an example of how the SmartMesh method works. As illustrated in FIG. 7, a set of flow intensity measurements includes five flow intensity measurements $C=\{a,b,c,d,e\}$. In a first iteration of the SmartMesh method, measurement a is randomly selected as the reference measurement. After modeling relationships with each of the other four measurements (4 searches), it is determined that a has relationships with b and c. Thus, a, b, and c are grouped together in the cluster $\{a,b,c\}$. Since both b and c have linear relationships with a, they are likely to have a linear relationship with each other, so a model the relationship between b and c is calculated. Conversely, $\{d,e\}$ do not have any linear relationships with a, so they are unlikely to have linear relationships with $\{b,c\}$. Therefore, there is no search for any relationships between $\{d,e\}$ and $\{b,c\}$. In a second iteration of the SmartMesh method, measurement e is randomly selected as the reference measurement from the set $C_2=\{d,e\}$. After another search, it is determined that e has a relationship with d, and $C_3$ is empty after the first two iterations.

For further understanding of the SmartMesh method, consider a triangle relationship among three measurements [a,b,c]. In one case, assume that a has linear relationships with b and c, i.e. $a=f(b)$ and $c=g(a)$ where f(.) and g(.) are linear functions as shown in Equation (1). Therefore we can conclude the linear relationship between b and c as $c=g(f(b))$. As described above, in each relationship search, two models are constructed with reverse input and output between two flow intensity measurements. If both functions f(.) and g(.) are linear, then the function g(f(.)) is also linear. However, since modeling errors exist in both $a=f(b)$ and $c=g(a)$, the derived equation $c=g(f(b))$ may precisely characterize the relationship between b and c. Therefore, as illustrated in FIGS. 6A and 6B, the SmartMesh method models their relationship directly with observed data.

In another case, assume that a has a relationship with b but not c. In this case, it is unlikely that b and c will have a strong relationship. Otherwise, as analyzed in the first case, theoretically we could conclude a linear relationship between a and c, which contradicts the assumption in this case. However, in practice, there may exist modeling errors in these equations. A threshold $\tilde{F}$ can be selected, and Equation (9) can be used to determine whether two measurements have a relationship or not. For the second case, if the correlation between a and c has a fitness score slightly below the threshold, the correlation between b and c could still have a fitness score slightly higher than the threshold. Therefore, due to modeling errors ε in Equation (1), in practice the second case could still happen in rare occurrences. Since the SmartMesh method does not search relationships between measurements that belong to different clusters, it may not discover as many invariants as FullMesh method does. Accordingly, the SmartMesh method approximates the results of the FullMesh method.

With minimal loss of accuracy, the SmartMesh method significantly reduces the computational complexity of an invariant search. The computational complexity of Part I of the FullMesh method can be denoted as $T_1$, and includes $n(n-1)/2$ searches, i.e., $T_1=n(n-1)/2$. The computational complexity of the SmartMesh method can be denoted as $T_2$. Given n measurements, assume that the set of measurements C can be split into K clusters $W_s(1 \leq s \leq K)$, as illustrated in FIGS. 6A and 6B. For convenience, the size of cluster $W_s$ can be denoted as $m_s$, such that $m_s=\{W_s\}$, and $$\sum_{s=1}^{K} m_s = |C| = n.$$

For the first iteration of the SmartMesh method, the randomly selected reference measurement needs n−1 searches to discover its cluster $W_1$ and then $(m_1-1)(m_1-2)/2$ searches are needed to discover invariants within this cluster $W_1$. Therefore, the computational complexity of the first iteration can be calculated with the following equation:

$$T_2(1) = n - 1 + \frac{(m_1 - 1)(m_1 - 2)}{2} \quad (11)$$
$$= n - m_1 + \frac{m_1(m_1 - 1)}{2}$$

For the second iteration of the SmartMesh method, the second reference measurement needs $n-m_1 1$ searches to discover its cluster $W_2$ and then $(m_2-1)(m_2-2)/2$ searches are needed to discover invariants within this cluster $W_2$. Therefore, the computational complexity of the second step $T_2(2)$, by replacing $m_1$ with $m_2$ and replacing n with $n-m_1$ in Equation (11). Thus, for all K steps, the computational complexity of the SmartMesh method can be calculated with the following equation:

$$T_2 = \sum_{s=1}^{K} T_2(s) \quad (12)$$
$$= \sum_{s=1}^{K} \frac{m_s(m_s - 1)}{2} + \sum_{s=1}^{K}\left(n - \sum_{j=1}^{2} m_j\right)$$
$$= \sum_{s=1}^{K} \frac{m_s(m_s - 1)}{2} + \sum_{s=1}^{K} (s-1)m_s,$$

where $n = \sum_{j=1}^{K} m_j$.

The SmartMesh method is a randomized method because the sequential order of clusters $W_s$ is randomly determined by the selection of reference measurements, and the sequential order of cluster sizes could affect the complexity $T_2$ of the method significantly. Given a sequential order of cluster size $(m_1, m_2, \ldots, m_K)$, Equation (12) can be used to calculate its computational complexity $T_2(m_1, m_2, \ldots, m_K)$. For K clusters, totally it is possible to have K! such sequential orders. For convenience, $o_i(1 \leq i \leq K!)$ can be used to represent a sequential order of cluster sizes, i.e., $o_i$=Permutation $(\{m_s\}_{1 \leq s \leq K})$. Note that the sequential order of cluster sizes $o_i$ only affects the second item at the right side of Equation (12) but not the first item. Given n measurements that can be split onto K cluster sizes, if the cluster sizes montonely decrease at each step, i.e., $m_1 \geq m_2 \geq \ldots \geq m_K$, this results in the smallest $T_2$. Conversely, if the cluster sizes montonely increase at each step, we have the largest $T_2$.

Since the reference measurement is randomly selected at each step and larger clusters include more measurements, the probability to choose a reference measurement from a large cluster is higher than from a small cluster. Therefore, in the average case, $T_2$ should be biased toward the smallest $T_2$. Given a sequential order of cluster sizes $m_1, m_2, \ldots, m_K$, we can calculate the probability of the sequential order of clusters with the following equation:

$$P(m_1, \ldots, m_K) = P(m_1)P(m_2)(m_1)\ldots P(m_K|m_1, \ldots, m_{K-1}) \quad (13)$$
$$= \frac{m_1}{n} \frac{m_2}{n - m_1} \cdots \frac{m_K}{m_K}$$
$$= \prod_{j=1}^{K} \frac{m_j}{n - \sum_{i=1}^{j-1} m_i}$$

Based one Equations (12) and (13), the computational complexity of the average case can be calculated with the following equation:

$$E(T_2) = \sum_{i=1}^{K!} T_2(o_i)P(o_i), \quad (14)$$

where $T_2(o_i)$ and $P(o_i)$ are given in Equation (12) and Equation (13) respectively.

In all cases of the SmartMesh method, $T_2 \leq T_1$. Given a sequential order of cluster sizes $(m_1, m_2, \ldots m_K)$, the reduction of computational complexity can be calculated with the following equation:

$$T_1 - T_2 = \frac{n(n-1)}{2} - \sum_{s=1}^{K} \frac{m_s(m_s - 1)}{2} - \sum_{s=1}^{K}\left(n - \sum_{j=1}^{s} m_j\right) \quad (15)$$
$$= \frac{n(n-1)}{2} - \sum_{s=1}^{K} \frac{m_s^2}{2} + \sum_{s=1}^{K} \frac{m_s}{2} - \sum_{s=1}^{K}\left(n - \sum_{j=1}^{2} m_j\right)$$
$$= \frac{n^2}{2} - \sum_{s=1}^{K} \frac{m_s^2}{2} - \sum_{s=1}^{K}\left(n - \sum_{j=1}^{s} m_j\right)$$
$$= \frac{\left(\sum_{s=1}^{K} m_s\right)^2 - \sum_{s=1}^{K} m_s^2}{2} - \sum_{s=1}^{K}\left(n - \sum_{j=1}^{s} m_j\right)$$
$$= \sum_{s=1}^{K}\left[m_s\left(-\sum_{j=1}^{s} m_j\right)\right] - \sum_{s=1}^{K}\left(n - \sum_{j=1}^{s} m_j\right)$$
$$= \sum_{s=1}^{K} (m_s - 1)\left(n - \sum_{j=1}^{s} m_j\right).$$

Since $m_s \geq 1$ and $s \leq K$, $$n = \sum_{j=1}^{K} m_j \geq \sum_{j=1}^{s} m_j$$

in all cases. There we should always have $T_1-T_2>0$. The value of $T_1-T_2$ is dependent on the sequential order of cluster sizes.

For example, consider two special cases. In the first case, the set of n measurements is split into K=n clusters with the size of each cluster $m_s$=1 (i.e., there is no relationship between any measurements). According to Equation (15), $T_1$=$T_2$ for the first case. In the second case, the set of n measurements is split into K=1 cluster with the size of this cluster $m_1$=n (i.e., there is a relationship between any pair of measurements). In the second case, $T_1$=$T_2$ as well. According to Equation (15), for all other cases where 1<$m_1$<n, $T_1$>$T_2$. Thus, the SmartMesh method significantly reduces the computational complexity for invariant searching, as compared to the FullMesh method.

Figure 8A:
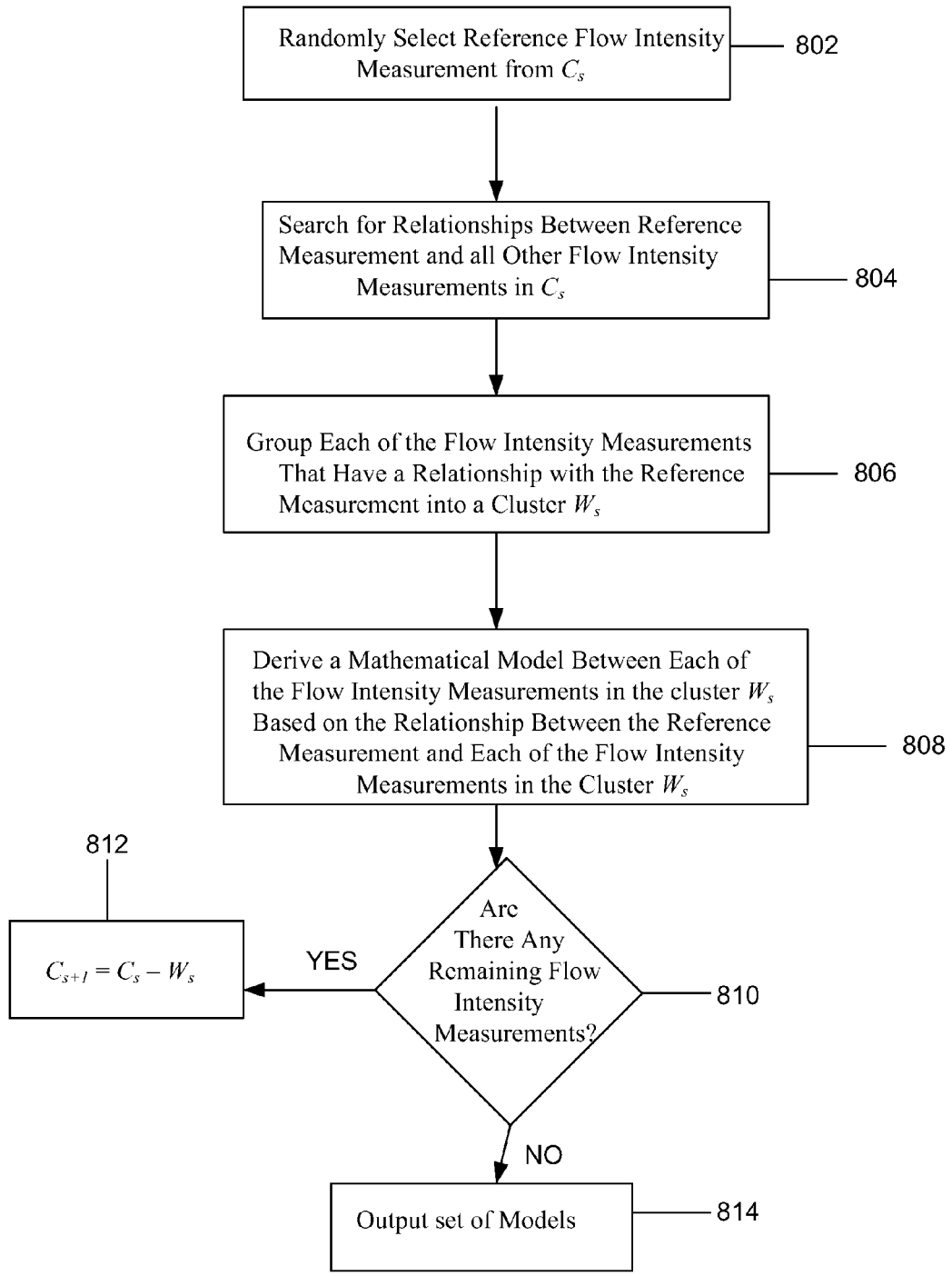
FIG. 8A illustrates a method of modeling relationships between flow intensity measurements in a distributed system according to another embodiment of the present invention.

FIG. 8A illustrates a method of modeling relationships between flow intensity measurements in a distributed system according to another embodiment of the present invention. FIG. 8B is pseudo code of the method of FIG. 8A. One skilled in the art will readily be able to associate portions of the pseudo code of FIG. 8B with the steps of FIG. 8A. For convenience, the method of FIGS. 8A and 8B is referred to herein as the "SimpleTree" method.

As illustrated in FIG. 8A, steps 802, 804, 806, 810, 812, and 814 are substantially the same as, steps 602, 604, 606, 610, 612, and 614 of FIG. 6A, and the descriptions of these steps are not repeated. At step 808, the SimpleTree method derives a mathematical model between each of the flow intensity measurements in a cluster $W_s$ based on the relationship between the reference measurement $I_i$ and each of the flow intensity measurements in the cluster $W_s$. For example, consider a triangle relationship among three measurements {x,y,z} As time series, assume that x has already built models with y and z. In the SmartMesh method of FIG. 6A, monitoring data is used to learn a model between y and z. However, the SimpleTree algorithm directly derives a mathematical relationship between y and z without using any monitoring data.

Introducing the backward shift operator $q^{-1}$ such that $q^{-1}y(t)=y(t-1)$, the ARX model in Equation (1) can be rewritten as:

$$y(t) = x(t)\frac{b_0 + b_1 q^{-1} + \ldots + b_m q^{-m}}{1 + a_1 q^{-1} + \ldots + a_n q^{-n}}. \quad (16)$$

Without loss of generality, we assume that k=0 in Equation (1). If k>0, we can set the first k coefficients $b_i$=0(0≤i≤k1). Lets denote $a_0$=1, $A_n$=($a_0$, $a_1$, ..., $a_n$), $B_m$=($b_0$, $b_1$, ..., $b_m$), and $Q_k$=($q^0$, $q^{-1}$, ..., $q^{-k}$). Note that $A_n$ and $B_m$ are coefficient vectors. According to the definition of θ in Equation (2), we should have $(1,\theta^T)$=$(A_n,B_m)$. Therefore, Equation (16) can be rewritten as:

$$y(t) = x(t)\frac{B_m Q_m^T}{A_n Q_n^T}, \quad (17)$$

where $Q^T$ is the matrix transposition of Q. Similarly, assume that x and z have the following relationship:

$$x(t) = z(t)\frac{D_{\hat{m}} Q_{\hat{m}}^T}{C_{\hat{n}} Q_{\hat{n}}^T}, \quad (18)$$

where $D_{\hat{m}}$ and $C_{\hat{n}}$ are coefficient vectors. As described above, in each invariant search two models are constructed with reverse input and output between two flow intensity measurements. Thus, based on Equation (17) and Equation (18), the following model between y and z can be derived:

$$y(t) = z(t)\frac{Q_m B_m^T D_{\hat{m}} Q_{\hat{m}}^T}{Q_n A_n^T C_{\hat{n}} Q_{\hat{n}}^T}, \quad (19)$$

where $B_m^T D_{\hat{m}}$ is a (m+1)×($\hat{m}$+1) matrix and $A_n^T C_{\hat{n}}$ is a Error! Objects cannot be created from editing field codes. matrix. For convenience, denote V=$B_m^T D_{\hat{m}}$ and U=$A_n^T C_{\hat{n}}$.

According to the rules of polynomial multiplication, Equation (19) can be rewritten with the following equation:

$$y(t) = z(t)\frac{F_{m+\hat{m}} Q_{m+\hat{m}}^T}{E_{n+\hat{n}} Q_{n+\hat{n}}^T}, \quad (20)$$

where $F_{m+\hat{m}}$ and $E_{n+\hat{n}}$ are m+$\hat{m}$+1 and n+$\hat{n}$+1 dimensional coefficient vectors, respectively. Denote the $j^{th}$ (0≤j≤m+$\hat{m}$) element of $F_{m+\hat{m}}$ as $F_{m+\hat{m}}^j$ and the $i^{th}$ (0≤I≤n+$\hat{n}$) element of $E_{n+\hat{n}}$ as $E_{n+\hat{n}}^i$. Based on Equation (19) and Equation (20), the following equations are derived:

$$V = B_m^T D_{\hat{m}}, \quad (21)$$

$$U = A_n^T C_{\hat{n}}, \quad (22)$$

$$F_{m+\hat{m}}^j = \sum_{i=1}^{j} V_{i,j-i}, \quad (23)$$

$$E_{n+\hat{n}}^l = \sum_{k=0}^{l} U_{k,l-k}. \quad (24)$$

Note that for any i>m or j>$\hat{m}$, $V_{i,j}$=0, and for any i>n or j>$\hat{n}$, $U_{i,j}$=0.

In the triangle relationship among flow intensity measurements {x,y,z}, given two models with parameters $(1,\theta_{yx}^T)$=$(A_n,B_m)$ and $(1,\theta_{xz}^T)$=$(C_{\hat{n}},D_{\hat{m}})$, the matrices U and V can be calculated using Equations (21) and (22). A model $\theta_{yz}$ can then be derived with $(1,\theta_{yz}^T)$=$(E_{n+\hat{n}},F_{m+\hat{m}})$, where $F_{m+\hat{m}}$ and $E_{n+\hat{n}}$ are computed using Equations (23) and (24).

Step 808 of FIG. 8A is shown at 850 of the pseudo code of FIG. 8B. As illustrated at 850 of the pseudo code of FIG. 8B, the models between each of the flow intensity measurements in the cluster $W_s$ is derived from the relationships of the flow intensity measurements in the cluster $W_s$ and the reference measurement $I_i$ using Equations (21)-(24). Thus, after randomly selecting a reference measurement $I_i$ (step 802) and defining its cluster $W_s$ (steps 804 and 806), the SimpleTree method does not use Equation (7) to learn models for measurements in the same cluster $W_s$. Instead, it mathematically derives these models from the learned models that correlate the reference measurement $I_i$ with the other measurements in the cluster $W_s$. Note that any two measurements in the same cluster form a triangle relationship with the reference measurement. Therefore, the SimpleTree method only needs to search a two-level tree structure for each cluster, whose root is the reference measurement.

As described above, a derived model may not be as accurate as a model directly learned from observed monitoring data. The modeling errors of the two models used to infer the third model can convolve and then lead to a large error in the third model. In addition, the order of a derived model may be is larger than that of a learned model. For example, while $\theta_{yx}$ is an n+m dimensional vector and $\theta_{xz}$ is a n̂+m̂ dimensional vector, the derived model $\theta_{yz}$ is an n+m+n̂+m̂ dimensional vector. However, in distributed information systems, the latency of user requests ban be very short so that the orders of ARX models (such as [n,m] and [n̂,m̂]) are typically very small. Therefore, the order of a derived model (such as [n+n̂, m+m̂]) will remain relatively small even though it is larger than that of the other two models. Compared to the SmartMesh method, the SimpleTree method may lose more invariants because some derived models may not be accurate enough to pass the sequential testing process (i.e., Part II of FullMesh method).

The computational complexity of the SimpleTree method can be denoted as $T_3$. Since the model orders such as [n,m] and [n̂,m̂] are very small, the computational complexity of Equations (21)-(24) can be so small as to be ignored in the analysis of $T_3$. By following a similar analysis to $T_2$ described above, the following equation can be used to calculate $T_3$:

$$T_3 = \sum_{s=1}^{K} T_3(s) = n - 1 + n - m_1 - 1 + \ldots + n - \sum_{s=1}^{K-1} m_3 - 1 \quad (25)$$

$$= K(n-1) - \sum_{s=1}^{K}(K-s)m_s = \sum_{s=1}^{K} sm_s - K$$

$T_3$ is also dependent on the sequential order of cluster sizes $\{m_s\}_{1 \leq s \leq K}$. Given n measurements that can be split into K clusters, if the cluster sizes montonely decrease at each step i.e., $m_1 \geq m_2 \geq \cdots \geq m_K$, we have the smallest possible $T_3$. Conversely, if the cluster sizes montonely increase at each step, we have the largest $T_3$ (the worst case). For the average case, the expected value of $T_3$ is given by:

$$E(T_3) = \sum_{i=1}^{K!} T_3(o_i) P(o_i), \quad (26)$$

where $T_3(o_i)$ and $P(o_i)$ are given by Equation (25) and Equation (13), respectively.

In practice, for a specific problem, it may not be known how K (the number of clusters) increases with the growth of n (the number of measurements). If K is constant, the computational complexity of Simple Tree algorithm $T_3$ would be O(n); if K increases with O(lg(n)), $T_3$ would be O(n lg(n)). Therefore, $T_3$ is not only dependent on the size of input data n but also the number of clusters K included in this data. However, compared to $T_2$, the reduction of computational complexity in $T_3$ can be derived with the following equation:

$$T_2 - T_3 = \sum_{s=1}^{K} T_2(s) - T_3(s) \quad (27)$$

$$= \sum_{s=1}^{K} \frac{(m_s - 1)(m_s - 2)}{2}$$

Since $m_s \geq 1 (1 \leq s \leq K)$, $T_2 \geq T_3$. If a set of n measurements is split into K=n clusters with the size of each cluster $m_s=1$, according to Equation (27), then $T_2=T_3$. However, if the set of n measurements is split into K=1 cluster with the size of this cluster $m_1=n$, then $T_2=n(n-1)/2$ and $T_3=n-1$. In this case, we reduce the computational complexity of invariant search from $O(n^2)$ to O(n). In general, according to Equation (27), the SimpleTree method significantly reduces the computational complexity, as compared to the SmartMesh method, although the SimpleTree method may be less accurate than the SmartMesh method.

Figure 9:
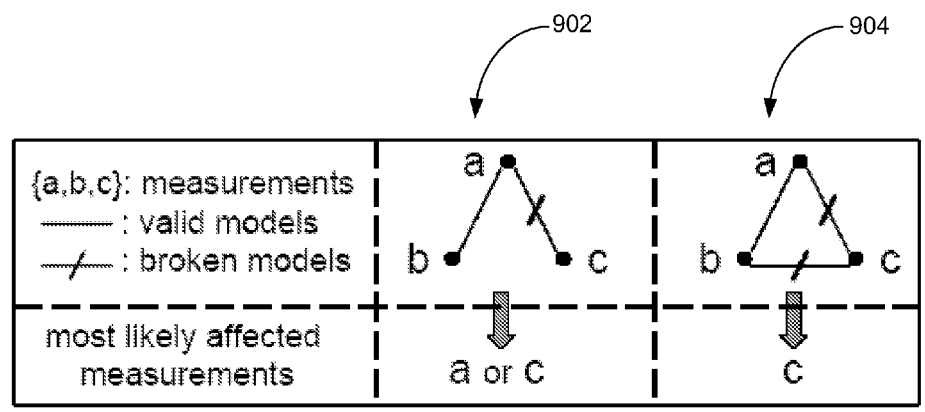
FIG. 9 illustrates an example of graph-based reasoning in fault isolation.

As discussed above, any two measurements in the same cluster WS form a triangle relationship with their reference measurement and in this relationship we use two leaned models to derive the third one. For some system management tasks, the third model may only provide "redundant" information because it can be derived from the other two models directly. In this case, we may only need to search the tree structure of invariants without any model derivation in SimpleTree algorithm. However, for some system management tasks such as fault isolation, these derived models could be used to isolate faults more precisely. For example, in a triangle relationship, if we observe one of the two learned models is violated due to fault occurrences, we can not determine which measurement among the two measurements associated with the broken model is affected. Instead, if we have three models and two models are violated, it is possible to determine which measurement is most likely affected. An example is given in FIG. 9 to illustrate such graph-based reasoning in fault isolation. FIG. 9 illustrates two sets of models 902 and 904. In the case of 902, models relate flow intensity measurements a and b, and a and c, and the model between a and c is broken. When a fault is detected in the model between a and c, it is possible that a or c is the flow intensity measurement affected by the fault. In the case of 904, models relate flow intensity measurements, a and b, a and c, and b and c, and the models between a and c and b and c are broken. Thus, it is clear that mc is the flow intensity measurement affected by the fault.

Figure 10:
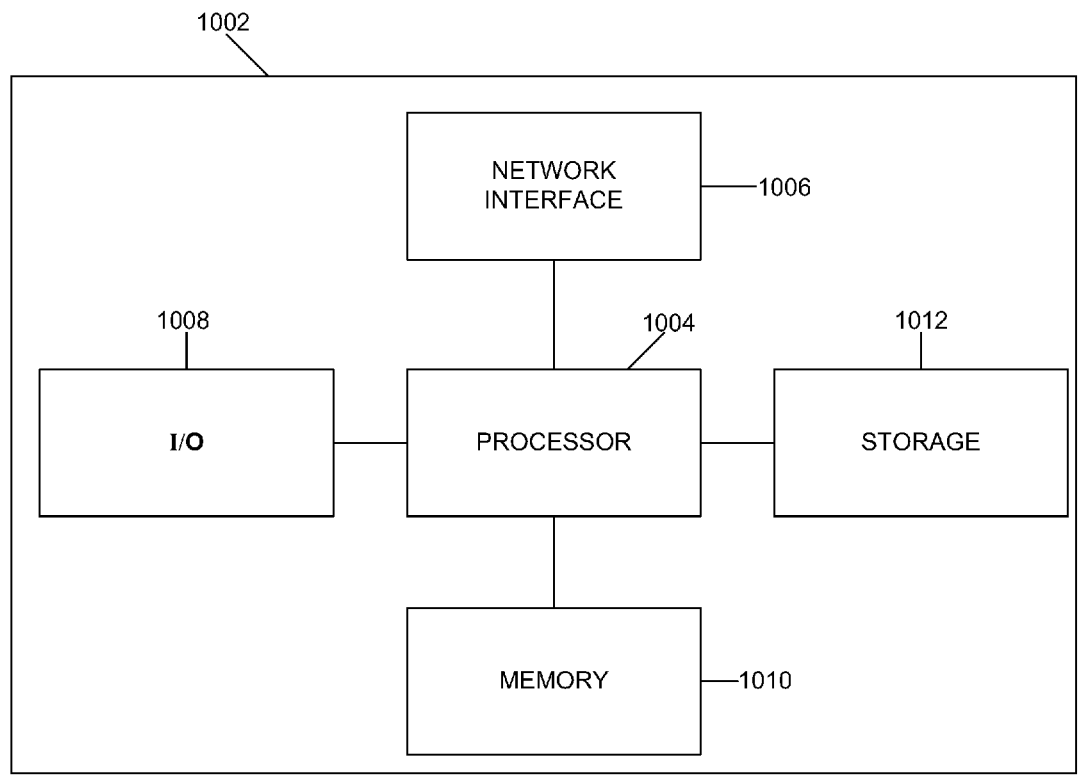
FIG. 10 shows a high level block diagram of a computer capable of implementing embodiments of the present invention.

The steps of the methods described herein may be performed by computers containing processors which are executing computer program code which defines the functionality described herein. Such computers are well known in the art, and may be implemented, for example, using well known computer processors, memory units, storage devices, computer software, and other components. A high level block diagram of such a computer is shown in FIG. 10. Computer 1002 contains a processor 1004 which controls the overall operation of computer 1002 by executing computer program instructions which define such operation. The computer program instructions may be stored in a storage device 1012 (e.g., magnetic disk) and loaded into memory 1010 when execution of the computer program instructions is desired. Thus, the operation of computer 1002 is defined by computer program instructions stored in memory 1010 and/or storage 1010 and the computer 1002 will be controlled by processor 1004 executing the computer program instructions. Computer 1002 also includes one or more network interfaces 906 for communicating with other devices via a network. Computer 1002 also includes input/output 1008 which represents devices which allow for user interaction with the computer 1002 (e.g., display, keyboard, mouse, speakers, buttons, etc.). One skilled in the art will recognize that an implementation of an actual computer will contain other components as well, and that FIG. 10 is a high level representation of some of the components of such a computer for illustrative purposes. One skilled in the art will also recognize that the functionality described herein may be implemented using hardware, software, and various combinations of hardware and software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for fault detection in a distributed system comprising:
   (a) randomly selecting one measurement from a plurality of flow intensity measurements;
   (b) searching for a relationship between said one measurement and each remaining one of the plurality of flow intensity measurements;
   (c) grouping said one measurement and each one of the plurality of flow intensity measurements other than said one measurement grouped into the cluster;
   (d) determining relationships between each of the flow intensity measurements other than said one measurement grouped into a cluster;
   (e) iteratively repeating steps (a)-(d) for remaining ones of the plurality of flow intensity measurements not grouped into a cluster until each of the remaining ones of the plurality of flow intensity measurements is grouped into a cluster;
   (f) validating relationships determined between ones of the plurality of flow intensity measurements to determine whether the relationships are invariant relationships;
   (g) predicting flow intensities based on the relationships determined to be invariant relationships; and
   (h) detecting faults in the distributed system by comparing measured flow intensity measurements to the predicted flow intensities.

2. The method of claim 1, wherein step (b) comprises:
   calculating a model of a relationship between said one measurement and each remaining one of the plurality of flow intensity measurements;
   calculating a fitness score for each model; and
   comparing the fitness score for each model to a threshold to determine which of the remaining ones of the plurality of flow intensity measurements have a relationship with said one measurement.

3. The method of claim 2, wherein said step of calculating a model of a relationship between said one measurement and each remaining one of the plurality of flow intensity measurements comprises:
   modeling the relationship between said one measurement and each remaining one of the plurality of flow intensity measurements using an AutoRegressive model with eXogenous inputs (ARX).

* * * * *